Dec. 19, 1933. G. T. MARKEY 1,939,908
HEATING SYSTEM FOR INCUBATORS
Filed June 2, 1928 4 Sheets-Sheet 3

INVENTOR.
George T. Markey
BY
Erwin, Wheeler & Woolard
ATTORNEYS.

Dec. 19, 1933.  G. T. MARKEY  1,939,908
HEATING SYSTEM FOR INCUBATORS
Filed June 2, 1928  4 Sheets-Sheet 4
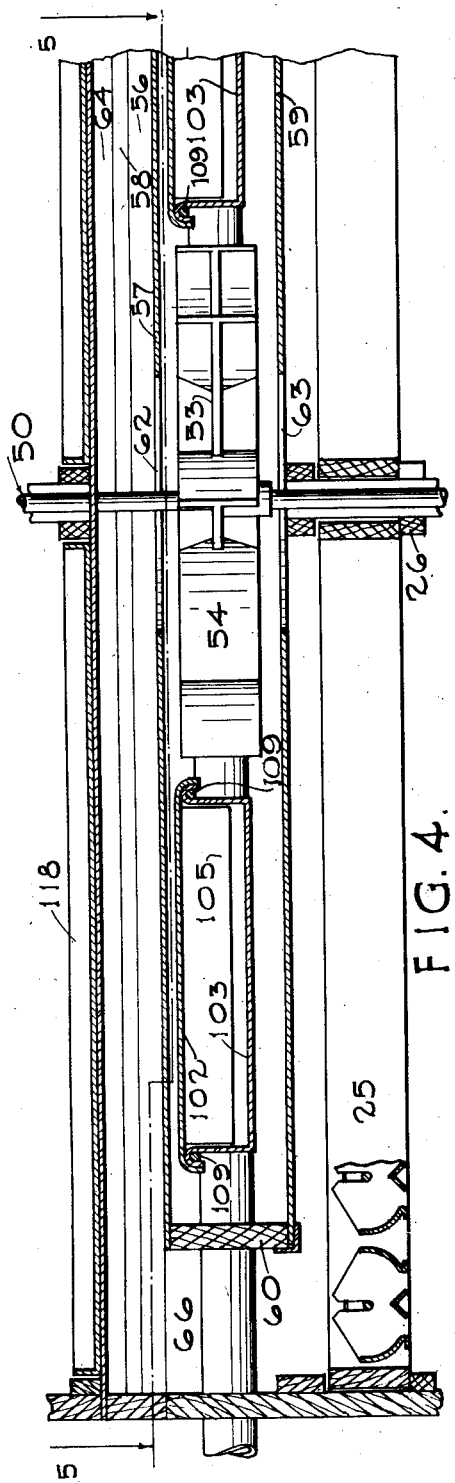
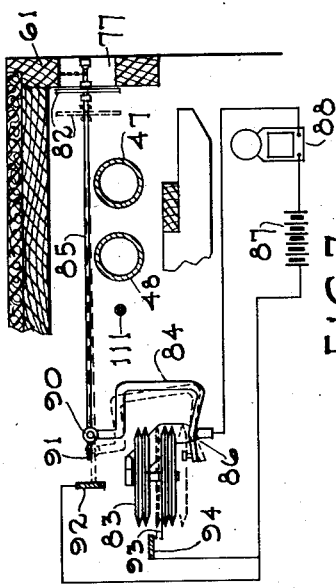
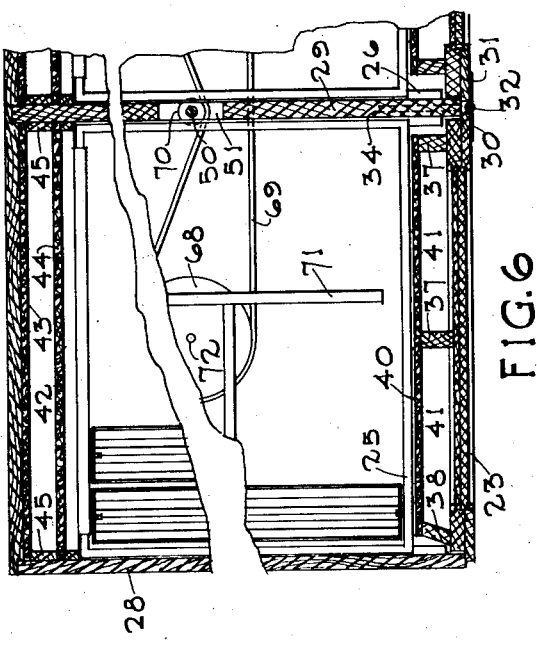
INVENTOR.
George T. Markey
BY Erwin, Wheeler + Woolard
ATTORNEYS.

Patented Dec. 19, 1933

1,939,908

UNITED STATES PATENT OFFICE 1,939,908

HEATING SYSTEM FOR INCUBATORS

George T. Markey, Fort Atkinson, Wis., assignor to James Manufacturing Company, Fort Atkinson, Wis., a corporation of Wisconsin Application June 2, 1928. Serial No. 282,302

14 Claims. (Cl. 119—35)

This invention relates to improvements in heating systems for incubators of the general type in which power driven means are employed to promote air mixing, primarily for heating, heat distributing purposes and for air vitalization by mixing, ventilation being accomplished by introduction of fresh air at different points in the incubator chamber to facilitate the mixing of the air, the distribution of heat and the control of heat and moisture.

The primary object of this invention is to provide adequate means for maintaining a correct temperature and moisture conditions uniformly in all portions of the incubator.

It is my object to provide means for churning the air and, at the same time, causing a vacuum in the top of a stack of egg trays, delivering the churned air over humidifying means for controlling its humidity and reducing its temperature, restoring its temperature, introducing fresh air into the churned air, evacuating a portion of the air that has once passed over the eggs and returning the remainder of the air thus humidified, heated and churned to where it can be again churned, mixed and diffused, preferably in combination with incoming air, and then allowed to rise gently between diffusing supports of numerous eggs by convection and also due to the creating of a vacuum at the top of the eggs due to the churning of the air in a separated space above the eggs thereby avoiding drafts, hot and cold spots and forced circulation of air which would move the air so rapidly that it would be unable to suitably treat the eggs.

It is my object to avoid previous mistakes in the prior art of using forced draft machines in which large quantities of air are taken in and discharged every few minutes.

More specifically stated my objects are:—to provide major heat supplying means with auxiliary intermittently and independently operable heating means more sensitive to control than the major heating means, the latter being preferably designed to operate within a range below maximum permissible temperatures; to utilize the auxiliary heating means for operating a signal in cases of extreme emergency; to provide for mixing heat distributing air currents over all of the heat radiating surfaces in such a manner as to keep such surfaces, and the air in contact therewith, from becoming overheated and devitalized; to provide improved means for mixing and maintaining the circulating air in a uniformly proper condition of temperature, humidity and purity; and to provide an incubator structure in which the aforesaid results may be accomplished with due regard for compactness and maximum egg receiving capacity in proportion to the size of the structure.

Further objects are to provide improved means for mechanically promoting air mixing in aid of uniform heating, vitalization, and uniform admission and distribution of fresh air without radical change of temperature in any egg tray receiving portion of the incubator; to provide adequate means for according different treatment of eggs in advanced stages of incubation from that accorded to the eggs in the primary stages of incubation, with particular reference to the heating requirements; to utilize the moving air of a power driven air mixing system for an effective insulation of eggs from external temperature conditions during the earlier stages of their incubation; to provide improved power driven means for mixing and directing the course of the heat carrying and distributing air currents within an incubator; to provide co-operating means distant from the mixing means for thoroughly mixing all portions of the air and obtaining absolute uniformity in its temperature preparatory to its flow over the surfaces of the eggs; to provide improved means for controlling the fresh air inlet apertures, whereby the admission of such air is, in part, made intermittent and subject to temperature conditions within the incubator to accomplish the double purpose of ventilation and heat control or limitation. The method disclosed in this application is claimed in copending application, Serial No. 664,795, filed April 6, 1933. Reference is made to Patent No. 1,837,458, issued December 22, 1931, to George T. Markey, which claims certain subject matter disclosed herein.

In the drawings:

Figure 4 is a fragmentary view (enlarged) in vertical section taken at right angles to that of Figure 2.

Figure 6 is a fragmentary view, also in horizontal section, drawn to line 6—6 of Figure 2.

Figure 7 is a detailed view of the thermostatically controlled air inlet valve controlling mechanism and alarm signal, a portion of the heat chamber wall being illustrated in vertical section.

Like parts are identified by the same reference characters throughout the several views.

Figure 1:
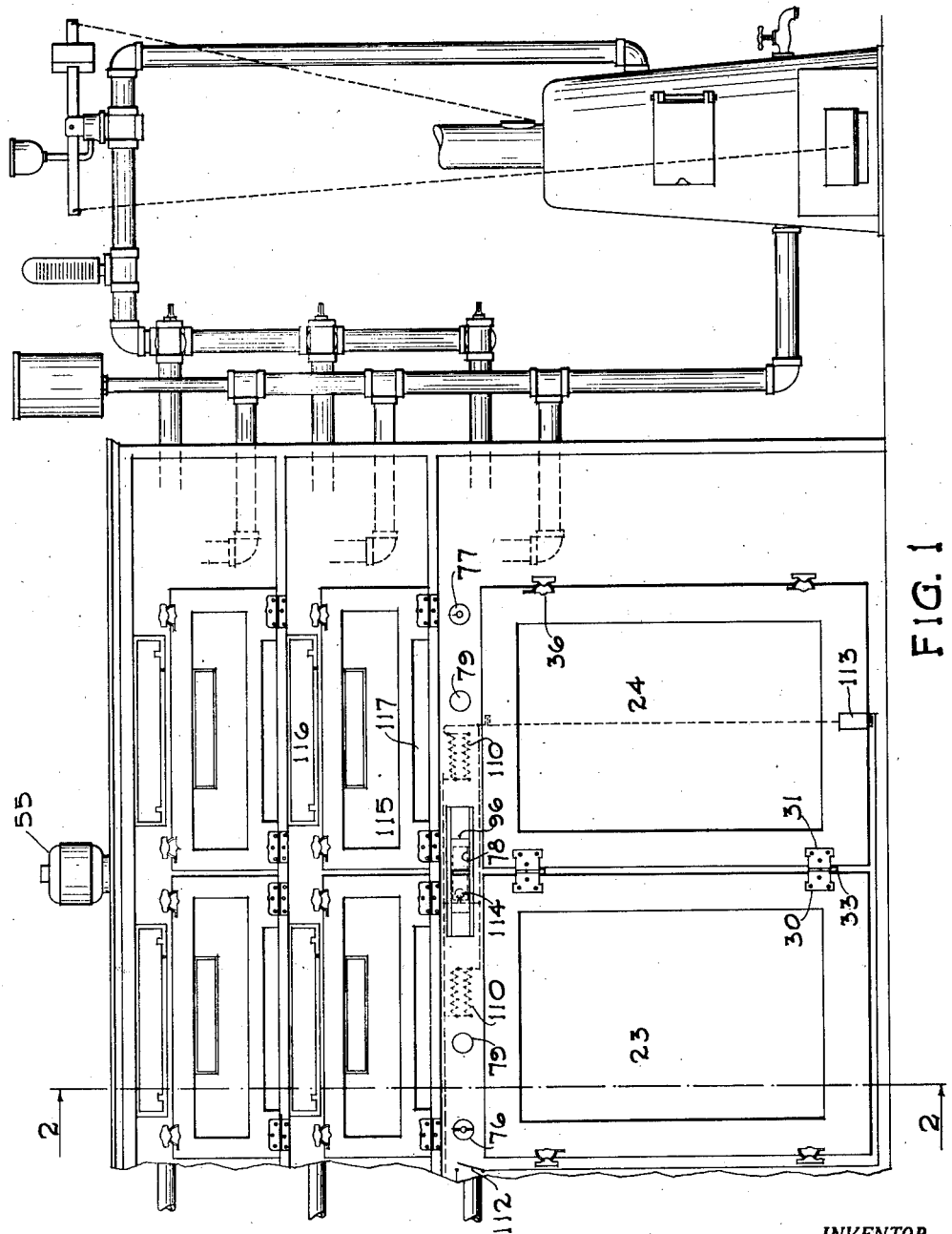
Figure 1 is a front elevation of an incubator unit embodying the invention herein claimed, the heating pipes and a wall fragment being extended to indicate their connection with a duplicate unit.

The incubator herein described is adapted to be constructed in one or more units which may be placed in a longitudinal series of any desired number of similar units connected with a common source, or sources, of heat and power. As shown in the drawings, each unit comprises one or more, (preferably a pair), of lower chambers, which, for convenience in description, will be designated as the incubating chambers, and taken together, these two chambers will be termed the incubating section of the unit in distinction from the upper section composed of hatching chambers. Access to the incubating chambers may be had through the doors 23 and 24 respectively. These incubating chambers are each designed to receive a considerable number of egg trays 25, one above the other and in close proximity, the distance between the trays being substantially equal to the vertical thickness of their supporting rails 26.

For convenience in description, the walls 27 and 28 of the incubating chambers will be referred to as the side walls of the incubating section, although, in a multiple series of units, these walls might be partition walls common to adjacent units. By way of distinction in the present description the wall 29 between the two incubating chambers will be designated as the central partition wall.

The doors 23 and 24 are hinged together, the leaves 30 and 31 having butts which receive a pintle 32, the lower end of which is extended and socketed in the head 33 of a screw 34 which is threaded into the central partition 29. The swinging margins of the doors are provided with latches 36 of any ordinary construction adapted to engage suitable catches carried by the side walls or door jambs. Each of the doorways may thus be made equal in width to the width of the chamber, the door constituting the entire front wall, from a point or line below the lowermost egg tray to a point or line above the uppermost egg tray, and when the door is opened, all of the trays in that chamber may be drawn out and replaced.

Also each door is double walled, and made to form part of the heat, fresh air and moisture distributing system, the outer and inner walls being separated from each other by the vertically extended strips 37 and 38. The strip 38 is located at the swinging margin of the door and is obliquely pitched to allow the door to close. The inner door wall 40 is attached to these spacing strips 37 and 38 so that vertical passages 41 are formed in each door.

The opposing wall, herein termed the rear wall of the unit, is also double and is formed with a corresponding passage 42 between the outer wall member 43 and the inner wall member 44, these two wall members being separated by the spacing strips 45. These passages 41 and 42 in the doors and rear wall respectively, receive the mixed air in the system associated with the heating chamber now to be described.

Between the upper egg tray or trays in the incubating section and the top wall members 56 of such section, sufficient space is provided for the horizontally extending heating pipes 47 and 48, which are preferably paired and arranged to extend along and adjacent to the front and rear wall respectively. This space constitutes the heating chamber. The pipes 47 may be assumed to be the outflow pipes and the pipes 48 the return-flow pipes.

A motor driven shaft 50 extends vertically through the center of the incubating section and upwardly through the hatching section in the incubator. The partition 29 is provided with a slot 51 to receive the shaft 50, the lower end of the shaft having a bearing in the bottom 52 of the incubating section. A stirrer like impeller is secured to the shaft 50, which is approximately midway between the pairs of heating pipes 47 and 48. This impeller is composed of a horizontally disposed central web 53 and arcuate wings 54 perpendicular to the web, each wing being secured to the web along its arcuate center line, whereby air may be mixed and moved outwardly from the central portion of the impeller on each side of the web in substantially equal volumes. An electric motor 55 drives the shaft 50, the latter being the motor shaft, or a shaft coupled end to end thereto. The action of the impeller stirrer 54 results in creating a vacuum by the movement of the air through the aperture 63. This provides an area of reduced pressure in the top portion of the egg chamber into which the air gently flows.

The impeller operates underneath upper wall members 56, 57 and 58, the members 56 and 58 being the top walls of the incubating section, which support the hatching section. The wall member 57 is a thin metal strip which spans the space between the wall members 56 and 58 and is secured to their under surfaces along their inner margins. This forms the top wall of what may be termed an impeller chamber, the bottom wall 59 of which is spaced from the wall members 57 by the end walls 60 of the housing. These housing end walls extend entirely across the heating chamber from the rear wall of the incubator section to the front wall member 61, above the doors. The pipes 47 and 48 extend through apertures in these wall members 60.

The housing walls 57 and 59 have central apertures or impeller chamber inlets 62 and 63 respectively (Figure 4) through which air may reach the impeller, the air being drawn through the apertures by suction as in an ordinary centrifugal fan, except for the fact that the horizontally disposed disc 53 separates the current of air entering through the upper impeller inlet 62 from that entering through the lower impeller inlet 63.

The air reaches the upper opening 62 through a passage 65 in the top wall members 56 and 58, extending across the central portion of the incubator parallel to the front and rear walls. The bottom wall 64 of the hatching chamber hereinafter described is preferably slotted to increase the vertical dimensions of this passage in order that air may flow freely through it from the open spaces 66 between the end walls 60 of the impeller housing and the side walls of the section. Part of the mixed air may pass upwardly through the egg trays and through these spaces 66 and then over the housing wall 57 in the passage 65 and to the impeller through the aperture 62. But the air ascending through these portions of the egg trays nearest the central partition will be deflected inwardly along the under surface of the lower housing wall 59, and to the under side of the impeller through the impeller inlet 63.

The end walls 60 of the impeller housing extend entirely across the incubator unit from front to rear as above explained, and the air thrown against them by the impeller is churned and deflected laterally to the heating pipes in eddies and counter currents in a manner peculiarly adapted to absorb and distribute the heat units without devitalizing the air as is done in cases where more prolonged contacts of particles of air with heated surfaces are permitted. This churning air also receives and distributes air from the moisture pans, and this aids in vitalization or/and in preventing devitalization. This churning air is also being constantly thrown by the impeller laterally as well as longitudinally and caused to pass downwardly in the passages 41 and 42, into the space between the bottom of the incubator and the lowest egg tray 25. Within this space, on each side of the central partition, horizontally disposed pulleys 68 are driven by a belt 69 from a pulley 70 on the motor driven shaft 50. Each of these pulleys is provided with a set of mixing arms 71 which preferably extend tangentially to an inner circle of the pulley and successively at right angles to each other. These arms and their associated pulleys revolve in the direction indicated by the arrows and thoroughly mix all of the air received from the front and rear passages preparatory to its upward movement through the egg trays.

The air passages in the front doors and rear walls form areas always occupied by warm air which act as insulating blankets on the sides of the column of egg trays to protect the eggs from cold air and to thereby prevent cold air impeding the convection flow within the egg chamber.

It will be observed that the currents of air enter the egg chamber horizontally from opposite sides and meet along a transverse center line, each opposing the momentum of the other and tending to cause an intermingling of the air along said line, said line including the axis of the mixing or distributing device having the mixing arms 71. Said arms are not formed to drive the air upwardly in the direction of the egg trays, but they revolve in a horizontal plane and cut across the inwardly flowing sheets of air on each side of said center line thereby checking velocity and destroying momentum effects which would otherwise tend to produce an ascending column along the vertical plane of said center line. The air is thus distributed laterally, and has greater pressure or concentration than that exposed to the suction of the impeller above the egg trays, and it is obvious that it will flow upwardly through the trays and about the eggs by reason of such differential pressures in the bottom and top portions of the chamber and between egg trays. The egg trays and eggs will also serve as baffles, compelling or tending to compel, a uniform distribution of the air, the trays serving to a considerable extent as air distributing foraminous partitions. It will also be observed that the suction pull upon the air in the top portion of the chamber is exerted angularly to the planes of the air flow in the bottom portion, and, in fact substantially at right angles thereto. This also tends to prevent concentration of current along paths of least resistance as in a chimney and all these factors insure proper ventilation for all parts of the egg containing space.

By providing these mixing devices underneath the egg trays and operating them in co-operation with the impeller and suitable air heating means, and by dividing the ascending air so that one half of it travels laterally and passes around the end walls 60 of the impeller housing and the other half passes underneath the impeller housing to its bottom inlet 63, and by operating the impeller within the housing to again divide the air and move it laterally toward the front and rear into the passages 41 and 42, the development of either concentrated current or so called dead spots in the egg containing portions of the incubator chambers is absolutely prevented and a uniform temperature maintained in all portions thereof. Owing to the fact that the air is heated just prior to its descent through the passages 41 and 42 to the bottom portion of the egg chambers, maximum heating efficiency is attained, and the churning and mixing currents, added to the flow of air into the passages bring such a relatively large number of particles of air into contact with the heating surfaces that such surfaces may be kept relatively cool by rapid absorption of heat units, as compared with the heating surfaces in gravity systems, or even those in ordinary forced draft systems wherein all the air travels in one direction over such surfaces.

To insure continued operation of the mixing device by the belt 69, one of its pulleys is preferably provided with a stud shaft 72 carried by a slide 73 which is connected by a spring 74 with one wall of the chamber, whereby the belt 69 may be constantly maintained under a driving tension.

One of the means for renewing the air supply and continuously venting a sufficient portion of the air to carry off the exhalations from the eggs and the means for humidifying the circulating air will now be described.

The portion 61 of the front wall of the incubator, above the doors, is provided with a series of openings, viz. the openings 76, 77, 78 and 79. The opening 76 is a small circular opening which may be left constantly open for the admission of a small quantity of fresh air into one of the spaces 66 between the associated end wall 60 of the housing and the side wall 28. The air admitted through this opening will pass upwardly and inwardly along the passage 65 to the impeller to be churned, mixed with the other air and heated as above described. The opening 77 is similarly located to admit air into the space 66 between the other end wall 60 of the housing and the side wall 27 and this air must also pass to the impeller and downwardly to the bottom of the incubating chamber before reaching the eggs.

The air from both of these openings will of course be mingled by the action of the impeller, but in order that the flow of air admitted through the two openings may be regulated to a certain extent in accordance with temperature conditions within the incubator, I preferably provide a controlling valve 82 for the aperture 77 and adjust this valve by means of a thermostat 83 which operates through a yoke shaped lever 84 and rod 85 to open and close the valve, the lever 84 being fulcrumed at 86. The lever 84 will preferably be included in the circuit of a battery or other source of electric energy indicated conventionally at 87.

Said circuit also preferably includes an alarm signal indicated conventionally at 88. The inner end of the rod 85 is pivoted to the lever at 90 and has a projecting portion 91 composed of electrically conductive material adapted to contact with a terminal 92 in said circuit, whereby the circuit may be closed and the signal given when the expansion of the thermostat exceeds a predetermined limit. Similarly, an undue contraction of the thermostat may bring a terminal arm 93 into engagement with a contact piece 94 to close the circuit and operate the signal.

The opening 78 is a vent opening. This opening is preferably flanked on all sides by inwardly projecting passage walls 95, extending over the adjacent heating pipes 47 and 48 into proximity to the impeller, whereby a portion of the air thrown outwardly by centrifugal force by the impeller blades 54 will be driven through the opening 78 to the exterior without absorbing any material number of heat units from the heating pipes. The volume of air delivered through this outlet opening may be regulated manually by means of the exterior shutters or slides 96.

There are two openings 79 in the front wall member 61 and these are normally closed by interior hinged lids 100 which will be pushed to open position by a hook rod 101 when such rod is inserted to adjust a cover 102 upon a water containing humidifier pan 103. The cover 102 has an upwardly projecting flange 104 which may be engaged by the hook rod to shift the cover to its proper position. The cover 102 has a downwardly projecting flange 105 to prevent the escape of vapor from underneath it, and the humidifying capacity of the humidifier pan will, therefore, be determined by the uncovered area. The pans 103 are supported by the rods 109 and their rear walls have hook flanges 108 to engage over one of the heating pipes to prevent the pans from shifting in position when their covers are being adjusted. Water is supplied to the pans from a source of constant level supply through a pipe 111 and hose connection 111'.

The auxiliary heaters and heat controlling devices will now be described.

A set of electric heaters 110 are located in the space between the front wall member 61 and the adjacent heating pipe 47 at which point they will be in the path of the air which is being driven toward the door passages 41. These heaters are connected in parallel in a circuit which is preferably independent of that controlled by the air inlet thermostat and are manually controlled by the switch 112. The heating circuit is also automatically controlled by the electric thermostat conventionally indicated at 113 (Figure 1), this thermostat being located near the bottom of the incubating unit where it will be responsive to the temperature of the air which is about to be delivered through the egg trays. When the manually operable switch 112 is closed, the electric thermostat 113 will function to control the heaters 110 in accordance with the temperature of the air circulated about the eggs within narrower limits of maximum and minimum temperature than is possible to obtain by any control of a major heating system which circulates a heating fluid through the pipes 47 and 48.

A lamp 114 may be included in the circuit of the heaters 110 and is preferably located in the vent passage 95 where it can be viewed through the vent opening 78. This lamp will indicate to an inspector whether the heaters are functioning. It will, of course, be understood that the heater for the major heating system will be controlled in an ordinary manner, and it is therefore not deemed necessary to illustrate or describe in detail the source of heat for the pipes 47 and 48 and the means for controlling it.

The hatching chamber portion of the unit will now be described.

Figure 2:
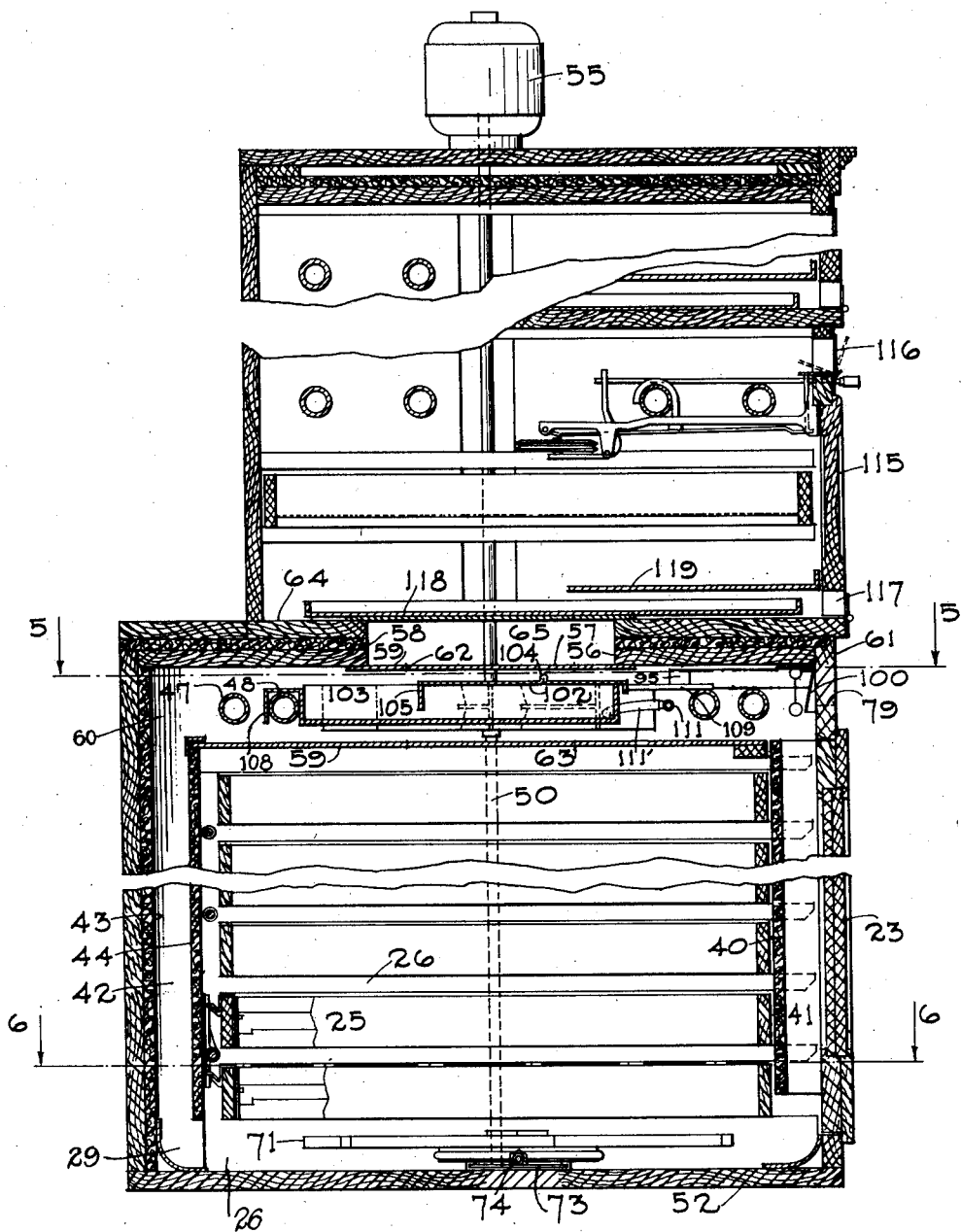
Figure 2 is a sectional view drawn generally on line 2—2 of Figure 1.
Figure 5:
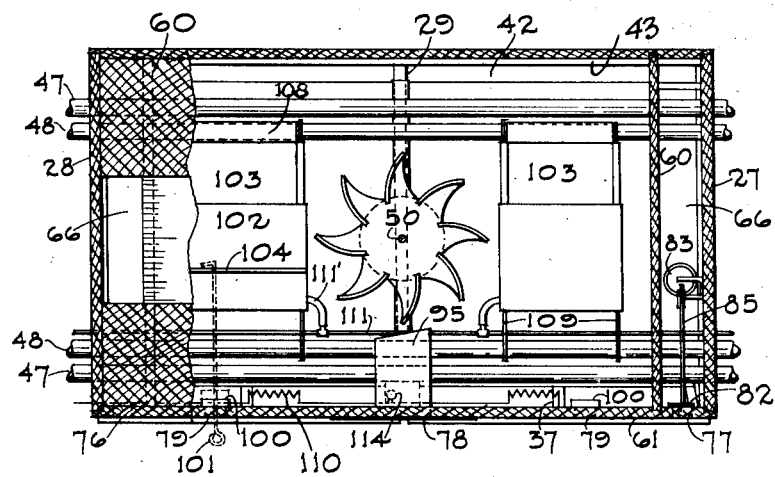
Figure 5 is a fragmentary view in horizontal section drawn to line 5—5 of Figure 2.
Figure 3:
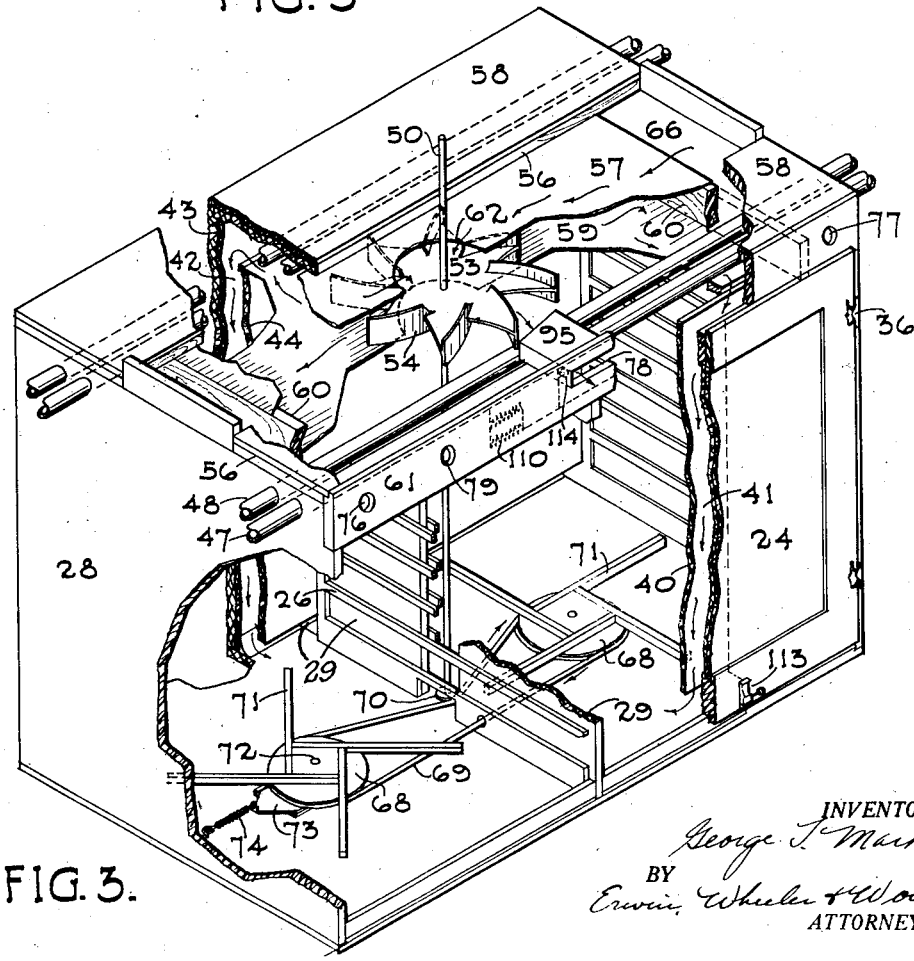
Figure 3 is an isometric view of the lower or the incubating section with parts of the walls broken away to show the interior.

Above the incubator chambers and the heating chamber associated therewith, a series of superposed hatching chambers are mounted as shown in Figures 1 and 2. Each hatching chamber receives one egg tray of the same size as those in the incubating section and the door 115 in the front wall of the chamber is of a size to permit the insertion and removal of the trays. Gravity ventilation is maintained through the thermostatically controlled shutter or damper 116, which allows air to pass out of the chamber. Air is admitted through the slot 117 in the lower portion of the front wall and is directed across the humidifying pan 118 underneath a horizontal baffle wall 119, which extends inwardly from the front wall to a point near the transverse center line of the humidifying pan. Except as herein described, these hatching chambers may be constructed in any ordinary manner, and as their structural features are not claimed herein, further description is unnecessary.

During the first seventeen days of incubation, the eggs will be kept in one of the incubating chambers comprising the lower section of the unit. Each egg tray may be marked for identification and a record kept of the time of its insertion in the incubating chamber so that no attention need be paid to its position in that chamber, the temperature being constant and uniform in all portions thereof. At the end of the seventeen day period the tray will be removed from the incubating section and placed in one of the superposed hatching chambers where it will remain until the chicks have hatched. No nursery tray will be required and the hatching chambers will be made of such size as to receive and support the trays taken from the incubating section, all trays being exactly alike; and provided with egg tilting mechanism which may be applied to either the front or rear wall of the tray as set forth in the companion application which has become Patent Number 1,796,872 issued March 17, 1931. Connections for operating such egg turning mechanism are shown at the left hand of the two lower trays shown partly in section in Figure 2.

It has been found in practice that during the first seventeen days of incubation it will be advantageous to provide uniform and constant conditions of heat, moisture and air circulation, the requirement for ventilation being considerably below that required by the eggs during the last few days of incubation which has herein been termed the hatching period. During the first seventeen days the admission of fresh air is largely a matter of maintaining the oxygen supply although it is desirable to change the supply to a sufficient extent to prevent the air from becoming extremely foul. The expelled air and other gases not only permit a certain degree of purification, but also provide space into which the fresh air may be drawn. During the hatching period continuous ventilation is desirable, but gravity circulation is preferred to the rapidly moving air in the system of the incubating section. Rapidly moving air absorbs more moisture from the shells of the eggs than slowly moving currents and the rapidly moving currents would also tend to chill the newly hatched chickens by promoting rapid evaporation. It has been found that separate hatching chambers better serve the exacting requirements for proper ventilation, humidification and absence from drafts during the hatching period, and also facilitate a segregation of the chicks from one egg tray from those hatching in another, each hatching chamber being arranged to receive one tray.

I claim:

1. In an incubator, the combination with an incubating chamber, of a heating chamber provided with major heat radiating devices, an auxiliary electrical heater provided with thermostatic circuit controlling means in the incubating chamber, and power driven means for circulating air across the main and auxiliary heating devices successively and distributing the heated air uniformly throughout the incubating chamber, said power driven means being arranged and adapted to mix the air heated by both heaters preparatory to its delivery to the eggs in the incubating chamber.

2. In an incubator, the combination with an incubating chamber, of a superposed heating chamber, a bottom mixing chamber in communication with the heating chamber at the sides of the incubating chamber and provided with means for mixing and distributing air to the incubating chamber, temperature controlled major and auxiliary heating devices independently operable within the heating chamber, and power driven means for circulating air across the major and auxiliary heating devices successively and downwardly in said passages to the bottom mixing chamber, said incubating chamber being adapted to form a return passage through which air may pass in distributed condition from the mixing chamber to the heating chamber.

3. In an incubator, the combination with an incubating chamber, of a superposed heating chamber, sets of radiator pipes for circulating a heating fluid through said heating chamber, an air mixing and directing chamber between said sets of pipes, and an air impeller within said chamber, said chamber having walls apertured to admit air from the incubating chamber along the axis of the impeller and being provided with closed ends and sides open along said pipes, whereby the impeller may churn and circulate air across the pipes, the walls of said incubator having passages adapted to receive such air and convey it to the bottom of the incubating chamber, and means for distributing the air upwardly through and with substantial uniformity in all portions of the incubating chamber to the suction side of the impeller.

4. In an incubator, the combination with an incubating chamber, of major heat radiating devices, including a radiator for circulating heating fluid, a temperature controlled independently operable auxiliary heater, power driven means for churning and circulating air across the major and auxiliary heating devices and through the incubating chamber, means for delivering air from one portion of the incubating chamber to one side of the plane in which the impeller revolves, and from another portion of the incubating chamber to another side of the impeller, whereby to promote division and distribution of the air flowing through the incubating chamber.

5. In an incubator, the combination with a heating chamber and an incubating chamber, of fluid circulating, major heat radiating devices, temperature controlled, relatively sensitive, instantly responsive and independently operable auxiliary heating devices, power driven means located in the heating chamber adjacent the heat radiating and auxiliary heating device and adapted for mixing and forcing air across the major and auxiliary heating devices successively and thence through the incubating chamber from an opposite side thereof, together with a co-operating power driven air mixing and distributing device in the path of such air at the opposite side of the incubating chamber from that at which the air forcing means is located, said mixing and distributing device being formed to intercept, break up, and laterally distribute currents of air moving from the air moving device, whereby such air may flow through the incubating portion of the chamber relieved of its momentum energy.

6. In an incubator, the combination with an incubating chamber having front doors and rear walls provided with vertically extending passages communicating with space above and below said chamber, a major heating system having a radiator for circulatory heating fluid in the space above said chamber, auxiliary temperature controlled electrical heaters, and means for churning and moving air from the central portion of said space across said radiator and electrical heater and downwardly through the door and rear wall passages to the space underneath the incubating chamber, said incubating chamber being formed to constitute a return passage through which air may pass in distributed form upwardly to the receiving side of the air forcing means.

7. In an incubator, the combination with an incubating chamber having front doors and rear walls provided with vertically extending passages communicating with space above and below said chamber, sets of radiator pipes in the space above said chamber, auxiliary temperature controlled electrical heaters and means for churning and forcing air from the central portion of said space across said pipes and electrical heater and downwardly through the door and rear wall passages to the space underneath the incubating chamber, said incubating chamber being formed to constitute a return passage through which air may pass in distributed form upwardly to the receiving side of the air moving means, together with co-operative means for humidifying the circulating air and thoroughly mixing all portions of such air before delivering it to the incubating chamber.

8. In an incubator, the combination with an incubating chamber, radiator pipes and electrical heaters disposed above said chamber, temperature controlled means for admitting air from the exterior for co-operative heating control, independently operable temperature controlled means for opening and closing the circuit of the electrical heaters, and means for mixing and circulating air across the radiator pipes and electrical heaters and distributing it through the incubating chamber for a uniform heating of all portions thereof, said circulating means including an air receiving housing provided with inlets in its top and bottom walls, a power driven rotary impeller having its central portions disposed to receive air from said inlets and adapted to move such air outwardly centrifugally, said housing having end walls against which said air may be moved and churned, and outlet openings to deliver it in the direction of the pipes and electrical heaters, preparatory to its delivery to the incubating chamber.

9. In an incubator, the combination with an incubating chamber having space above its egg receiving portion subdivided to provide passages for ascending currents of air in the ends of said space and descending currents of air at the sides thereof, independently operable heating elements in the side portion of said space, and an intermediate power driven impeller for circulating air, said subdivision being adapted to direct air from the incubating chamber through said end passages to the upper side of the impeller and to direct additional air to the underside thereof from other portions of the incubating chamber, said impeller having a horizontally disposed central web adapted to separate the air received from above from that received from below, and means for delivering the downwardly moving air currents to the bottom portions of the incubating chamber.

10. In an incubator, the combination with an incubating chamber, forming an upward passage for air and flanked on two sides with downward passages leading to space underneath the incubating chamber, of an impeller chamber above the incubating chamber, closed at its ends and having centrally apertured top and bottom walls and open sides, the apertures in the top and bottom walls being respectively in communication with opposite side portions of the incubating chamber, and the open sides being in registry with said downward passages, and an air impelling rotary device in the impeller chamber and disposed for rotation in a horizontal plane.

11. In an incubator provided with a heater dependent upon the combustion of fuel, the combination of an incubating chamber and a heating chamber provided with heat radiating devices connected with said source of heat supply, an auxiliary electrical heater, thermostatic means for controlling the current supply to said electrical heater, and power driven means for mechanically circulating air through said chambers and for mixing air coming from the respective heaters preparatory to its delivery to the incubating portion of the incubating chamber, said air mixing device being formed to break up air currents, to laterally distribute the air in a manner to maintain a differential pressure throughout the incubating portion of the chamber between the inlet and the outlet sides thereof, and to regulate the flow of air over the eggs in accordance with such differential pressure, substantially relieved of momentum effects which would otherwise tend to prevent such distribution.

12. In an incubator the combination with an incubating chamber, of an exterior chamber provided with an impelling device adapted to deliver sheets of air into the incubating chamber from opposite sides of one end portion and to withdraw air from other sides of the opposite end portion, and momentum checking, air distributing power driven means located substantially at the meeting line of the inlet currents, and adapted to drive the air laterally and interrupt propulsion along the line of circulation, whereby the air will be caused to flow through the incubating chamber by reason of differential pressure at the inlet and outlet ends thereof, independently of its velocity at the inlets.

13. In an incubator provided with an incubating chamber having inlets and outlets at its respective end portions and an exterior heating chamber provided with humidifying and circulating means adapted to withdraw air through said outlets and return it through the inlets, and co-operating power driven means adjacent the said inlets for breaking up the air currents, distributing the air laterally, and allowing it to flow through the portions of the incubating chamber under differential pressures between the inlet and outlet ends, and sets of horizontally disposed egg trays filling the intermediate space and tending to preserve said lateral distribution, said circulating means being provided with a central web and suction inlets at opposite sides of said web to equalize the suction at the outlets of the incubating chamber.

14. An incubator unit adapted for assembly with other units in a series having a common source of heat supply, said unit comprising a heating chamber and a pair of egg chambers partially separated by a central partition, and provided with hollow front and rear walls having slot-like openings at top and bottom affording communication between the heating chamber and the bottom of each egg chamber, humidifying pans in the heating chamber and power driven means for churning the air across the humidifying pans and heating devices, said churning means being adapted to move air downwardly in the front and rear wall passages, and into the heating chamber with equalized suction from other sides of the top portion of the incubating chamber.

GEORGE T. MARKEY.